United States Patent [19]

Smith

[11] Patent Number: 4,670,346
[45] Date of Patent: Jun. 2, 1987

[54] PROCESS FOR PREPARING HIGH HEAT-DISTORTION-TEMPERATURE POLYISOCYANURATE POLYMERS

[75] Inventor: Stuart B. Smith, Conyers, Ga.

[73] Assignee: Thermocell Development, Ltd., Knoxville, Tenn.

[21] Appl. No.: 869,334

[22] Filed: Jun. 2, 1986

Related U.S. Application Data

[63] Continuation-in-part of Ser. No. 766,140, Aug. 16, 1985, abandoned.

[51] Int. Cl.$^4$ .................. B32B 27/00; B05D 3/02; B44D 1/20; C08J 9/00
[52] U.S. Cl. ................... 428/422.8; 427/133; 427/385.5; 427/389.8; 427/393.5; 427/426; 428/423.1; 428/423.3; 428/423.7; 428/424.2; 521/78; 521/125; 521/129; 521/131; 521/902; 521/903; 521/912; 528/48; 528/52; 528/53; 528/57; 528/68; 528/73; 528/83
[58] Field of Search ............... 427/133, 385.5, 389.8, 427/393.5, 426; 428/423.1, 423.3, 423.7, 424.2; 521/78, 125, 129, 131, 902, 903, 912; 528/48, 52, 53, 57, 68, 73, 83

[56] References Cited

U.S. PATENT DOCUMENTS

| | | | |
|---|---|---|---|
| 3,169,945 | 2/1965 | Hostettler et al. | 521/138 X |
| 3,917,547 | 11/1975 | Massey | 521/903 X |
| 3,965,052 | 6/1976 | Iwasaki | 521/903 X |
| 4,077,920 | 3/1978 | Yukuta et al. | 521/903 X |
| 4,169,915 | 10/1979 | Heitmann et al. | 521/122 |
| 4,205,136 | 5/1980 | Ohashi et al. | 521/131 |
| 4,261,871 | 4/1981 | Smith et al. | 524/602 X |
| 4,359,541 | 11/1982 | Patton, Jr. et al. | 521/902 X |
| 4,359,550 | 11/1982 | Narayan et al. | 521/902 X |
| 4,452,829 | 6/1984 | Smith | 427/209 |
| 4,469,821 | 9/1984 | Anderson | 521/131 |
| 4,503,167 | 3/1985 | White | 521/105 |
| 4,555,418 | 11/1985 | Snider | 427/244 |

*Primary Examiner*—Thurman K. Page
*Attorney, Agent, or Firm*—Richard P. Crowley

[57] ABSTRACT

A process for preparing a slow-burning, low-smoking, high heat-distortion-temperature polyisocyanurate polymer and the polymer produced thereby, which process comprises reacting an MDI prepolymer with a caprolactone polyol in the presence of a trimerization catalyst, wherein the MDI prepolymer is prepared from an MDI having a functionality of about 2.4 or less, and particularly a 2.4 isomer, and with an ethylene-oxide-capped polypropylene oxide polyol, the process providing for the formation of a rigid, high heat-distortion RIM or an open-spray molded part.

33 Claims, No Drawings

4,670,346

PROCESS FOR PREPARING HIGH HEAT-DISTORTION-TEMPERATURE POLYISOCYANURATE POLYMERS

REFERENCE TO PRIOR APPLICATION

This application is a continuation-in-part application of U.S. patent application Ser. No. 766,140, filed Aug. 16, 1985, entitled PROCESS FOR PREPARING HIGH HEAT-DISTORTION-TEMPERATURE POLYISOCYANURATE POLYMERS, hereby incorporated by reference and now abandoned.

BACKGROUND OF THE INVENTION

Conventional RIM; that is, reaction injection molding, urethane polymers typically begin to soften at about 180° F. or above; that is, that they have a relatively low heat-distortion temperature (hdt). Often, polymeric RIM molded parts are coated with paint, and often the paint lines operate with ovens at temperatures above about 275° F., causing severe problems with distortion of the RIM molded parts. Polyureas are being tried in RIM processes, in an effort to raise the heat-distortion temperature, to eliminate problems associated with the painting of RIM parts. The polyureas, although they have higher heat-distortion temperatures, are very fast reacting and cause processing and manufacturing difficulties and problems in the production of large-type molded parts.

As more and more RIM-type molded parts and other molded polymers are employed in open and closed molds, for use in automotive and truck-type applications, the heat-distortion temperature and the fire performance of the resulting molded parts become an important and significant factor. For example, automotive engine hoods, which may be prepared employing RIM-molded techniques, are often exposed to hot exhaust manifolds and, therefore, require high heat-distortion temperatures and high fire-performance factors, in order to avoid any potential ignition fires. Therefore, there exists a need to provide polymers with good fire-performance properties and also with high heat-distortion temperatures which may be employed in RIM and other molding processes, typically by spraying, and particularly for use in automotive field, and where such polymers and molded parts are to be painted or be subject to other processes at temperatures greater than about 275° F.

SUMMARY OF THE INVENTION

The invention relates to a process of preparing a polymer and to the polymer so prepared, which polymer is characterized by a high heat-distortion temperature and good fire-performance properties. In particular, the invention concerns a process for preparing a slow-burning, low-smoking, high heat-distortion-temperature polyisocyanurate polymer and to the polymer so prepared.

It has been discovered that the trimerization of an MDI-based prepolymer with a heterocyclic hydrocarbon imine lactam polyol, such as a caprolactone polyol, provides a slow-burning, low-smoking polyisocyanurate-type polymer having high heat-distortion temperatures, typically of over 400° F. The polymer may be prepared easily by spraying A- and B-side components together with a reactive spray mixture either into an open or a closed mold; that is, as a RIM-type process or through an open mold onto the mold surface or onto a gel or other polymer surface. The reactive A and B components may be sprayed, to form a rigid RIM or open-sprayed polymer-molded part, which subsequently may be coated or otherwise treated at high temperatures, without heat distortion. If desired and optionally, a fibrous or particulate material, such as fiberglass rovings or choppings, may be added to the open-sprayed system, to increase the flexual modulus and to reduce the shrinkage of the resulting molded part.

The process of preparing the polyisocyanurate polymers of the invention comprises reacting 100 parts of an MDI prepolymer with a caprolactone polyol, typically a dipolyol or tripolyol, in the presence of a catalytic amount of a trimerization catalyst, to produce a slow-burning, low-smoking, heat-distortion-temperature polymer. In one embodiment, the process comprises preparing a slow-burning, low-smoking, high heat-distortion-temperature polyisocyanurate polymer, which process comprises reacting 100 parts of an MDI prepolymer with from about 5 to 50, and more typically, 35 to 50, parts of a caprolactone polyol in the presence of a catalytic amount of a trimerization catalyst, and wherein the MDI prepolymer is prepared by reacting 100 parts of the MDI, having a functionality of about 2.4 or less, with from about 35 to 75 parts of an ethylene-oxide-capped polyalkylene oxide polyol, such as a polypropylene oxide polyol. Typically, the process of preparing the MDI prepolymer comprises an A-side component, while the caprolactone polyester polyol and the trimerization catalyst comprise a B-side component, and the A- and B-side components are sprayed together generally in equal volume, to provide for the reaction of the A- and B-side components to form the polymer.

The MDI prepolymers, suitable for use in the invention, are prepared by employing a low-functionality MDI reacted with an ethylene-oxide-capped polyol, and typically an ethylene-oxide-capped polyalkylene oxide polyol, such as a polypropylene oxide polyol. Generally, the components of the prepolymer composition and then heated, typically about 150° F.; for example, 170° F. to 190° F., for a period of time, to effect the desired reaction, typically from 1 to 4 hours or, for example, 1½ to 2½ hours. The amount of the free NCO in the prepolymer may vary, and generally ranges from about 15% to 25% by weight, such as 18% to 23% by weight. The amount of the ethylene oxide polyol employed in preparing the prepolymer may vary, with low amounts of the polyol providing for a stiffer product, with higher amounts of the polyol providing for a more flexible product. Generally, the prepolymers are made by reacting 100 parts by weight of the low-functionality MDI with from about 35 to 75 parts by weight; for example, 40 to 65 parts by weight, of an ethylene-oxide-capped polypropylene polyol.

The MDI employed in preparing the prepolymer generally has an average functionality of about 2.4 or less; for example, 1.9 to 2.2, in average functionality. The low-functionality MDI, for example, may be methylene dipara phenylene isocyanates, such as a diphenyl methane 4.4, or preferably the 2.4 prime diisocyanate. It has been found that the employment of a generally high-functionality crude MDI, such as an MDI having a functionality of 2.9, in preparing the prepolymer, provides for a much slower reaction and, therefore, more brittleness in the molded parts. The prepolymer is preferentially prepared using an MDI of the 2.4 isomer, instead of the 4.4 isomer, in order to provide a prepolymer for the A-side component which may be transported in liquid form. A prepolymer made of the 4.4 isomer provides for a prepolymer, at temperatures below about 50° F., which solidifies, introducing difficulties into the transportation of the A-side component, unless additives are employed to reduce the solidification temperature. The 2.4 isomer of the MDI is preferred, since prepolymers prepared by the 2.4 isomer are typically liquid below about 0° F. and, therefore, may be transported easily. As stated, high-functionality MDIs, such as 2.9 functionality, provide for reactions which are much slower curing. while the impact resistance was higher with the low-functionality prepolymer than the conventional high-functionality MDI.

The ethylene-oxide-capped polyol employed in preparing the prepolymers of the invention comprises an ethylene-oxide-capped polyalkylene polyol, such as an ethylene-oxide-capped polypropylene polyol, and has, for example, a hydroxyl number ranging from about 25 to about 50, such as from about 30 to 45.

The lactone polyols employed in the practice of the invention comprise preferably a caprolactone polyol. The caprolactone polyester polyol employs typically difunctional or trifunctional polyols having only primary hydroxyl groups, and having generally a hydroxyl number ranging from about 300 to 600. The caprolactone polyester polyols have been employed in connection with the preparation of urethanes, in that such polyols provide for polymers having very high tensile strength and controlled functionality, and the poyols have a low acid number in the resulting urethane polyols and have excellent impact resistance and low smoke generation upon ignition. The caprolactone polyols, useful in reacting with the prepolymers, are commercially available as Tone TM polyol (a trademark of Union Carbide Corporation, see U.S. Pat. Nos. 4,261,871 and 3,169,945). The difunctional Tone polyols have an average molecular weight of 530 to 3000 and a hydroxyl number of 212 to 37. The trifunctional Tone polyols have an average molecular weight of 300 to 900 and a hydroxyl number of 560 to 187. The caprolactone polyols are particularly useful in the preparation of the polymers of the invention and comprise those trifunctional, rather than difunctional, polyols, and which polyols are generally liquid at temperatures of about 20° C. or below. While the difunctional, more solid, caprolactone polyols may be employed, where the polyols are solids, then such polyols must be heated or solubilized, which is a disadvantage using such polyols.

A combination of low molecular weight, e.g. less than 600, difunctional and trifunctional polylactone polyols may be used with the difunctional low molecular weight polylactone polyols providing improved low temperature impact resistance to the resulting product.

The amount of the polyol used for reacting with the prepolymer as a B-side component may vary, but typically the reaction is based on a ratio of about 2 parts of the prepolymer to 1 part of the polyol, and more typically the caprolactone polyols are employed in an amount ranging from about 5 to 50 parts, typically 35 to 50 parts, per 100 parts of the prepolymer. In the practice of the invention, it is necessary to use a flexible polyol in the preparation of the MDI prepolymer, in order to avoid unnecessary brittleness of the resulting polyisocyanurate polymer, where caprolactone polyols are employed. Generally, the higher the amount of the caprolactone polyol, the higher the amount of the rigidity in the resulting reactive polymer. Caprolactone polyester polyols, which are presently commercially available, have an average molecular weight ranging from about 500 to 3000 for the difunctional polyols and from about 300 to 900 for the trifunctional polyols. The polyols undergo reactions expected of a primary alcohol functionality, including reaction with isocyanates.

The reaction of the A- and B-side components in the process of the invention is carried out in the presence of a trimerization catalyst, with typically the catalyst placed on the B-side component. Typically, the trimerization catalyst employed comprises a single-stage catalyst which provides for a rapid and very high exotherm; for example, over 210° F., in less than about 10 seconds. Suitable trimerization catalysts for use in the process comprise, but are not limited to, organo metal catalysts, such as fatty-acid esters of alkali metal, such as potassium, and more particularly, for example, the $C_6$-$C_{12}$ esters like potassium octoate and potassium fatty-acid salts. Other trimerization catalysts suitable for use in the invention would include quaternary-ammonium salts and triazene-type salts. The trimerization catalyst may be used alone or in combination. The amount of the trimerization catalyst used in the process may vary, such as, for example, ranging from 2 parts per 100 parts of the MDI prepolymer; for example, ranging from about 0.1 to 2 parts, and more typically 0.2 to 1.

It is recognized that minor amounts of other additives may be employed in connection with the A and B components, such as, for example, but not limited to, the use of flame-retardant agents to enhance or impart desirable flame-resistant or flame-performance properties in the resulting spray polymer. Typical flame-retardant agents which may be employed include hydrated silicas and alumina, as well as organic-type flame-retardant agents, such as, for example, phosphates, halogenated compounds and more typically halogenated phosphate esters, such as, for example, polychloro phosphate esters, typically added to the B-side component, to reduce the viscosity and also to reduce flame spread of the polymer. In addition, often components, such as, for example, the trimerization catalyst, may have small amounts of moisture present, which water causes light foaming in the reacted polymer, resulting in foam density, for example, from about 35 to 65 pounds per cubic foot. Where such slight foaming is undesirable, moisture-scavenging agents may be incorporated, in order to reduce or prevent such foaming. For example, it has been found that the employment of molecular sieves or other moisture-scavenging agents may be employed, to eliminate foam tendency. In one embodiment, it has been found that dehydrated molecular-sieve particles, with an alkali cation suspended in a liquid suspending agent, such as a glycerine, may be added to the B-side component, to eliminate any tendency to foam.

In the event that a foam polyisocyanurate polymer is desired, a blowing agent may be employed, such as water, and more typically the use of a halocarbon, and more typically a chlorofluoro alkane, such as Freon 11, a trichlorofluoro methane, a Freon 113, a trichloro trifluoro ethane, may be employed, with the Freon 113 preferred for a spraying operation, since the hose temperature can run higher without premature blowing in the hose of the spraying equipment. Generally, where blowing agents are employed, it is desirable to employ a cell-control agent, and a typical cell-control agent would comprise a silicone or a hydroxy silicone material as an antifoamer and degassing agent and cell-control agent.

Where a polymer of increased flexual modulus and reduced shrinkage is desired, strengthing-type agents may be incorporated, either in the A- or B-side component, or introduced into the reaction mixture or into the spray pattern, to provide such enhanced flexual modulus, such as a fibrous or particulate-type material. Typical materials, which can be employed, include a wide variety of fibers, and more particularly glass fibers, such as chopped or woven glass fibers. The glass fibers may be chopped into short fibers by a chopper above the exit nozzle of the spray equipment, so that the chopped glass falls onto the reaction mixture exiting from the nozzle tip of the spraying equipment. In addition, particulate materials may be employed, as well as other additive materials, such as pigment dyes, carbon particles, carbon fibers, synthetic fibers, and various other additives.

The reaction mixture of the process may be sprayed or poured, to produce a foam or solid coating on a variety of substrates, since the reaction mixture adheres well to a variety of substrates. Generally, the process is carried out by spraying together the A- and B-side components into a closed mold, such as in a RIM-type process, or onto an open mold surface, and more typically onto a gel coat, such as a polyester gel coat or an acrylic gel coat in an open mold. It has been found that the process may be carried out by spraying the A- and B-side components onto a gel coat made, for example, of a neopentyl glycol resin or onto a vacuum-formed acrylic part, or onto a polyester resin substrate containing chopped fiberglass, or onto other polymer gel-type precoats in an open-molding process, with excellent adhesion; for example, onto an aliphatic polymer coating. Thus, the process of the invention and the resulting polymer are usefully employed in spraying open-mold techniques onto glass fiber or polymeric substrates, with good adhesion and stiffness. The caprolactone trimerization polymers of the invention, prepared with the use of the prepolymer, result in excellent fire properties and high heat-distortion temperatures, typically in excess of 275° F., and generally in excess of 400° F., and a flexible modulus of near 500,000 psi. The resulting polymer may be foamed to low densities of 20 pcf to 65 pcf, still exhibiting excellent properties. The resulting caprolactone trimer polymer exhibits excellent wetting ability to gel adhesion, to acrylic, to gel coats and aliphatic polymer coatings in open molds, and also has excellent wet-out on glass-fiber mats and rovings. Typically, the smoke values of the resulting polymer are less than about 50; for example, 30, and, where a flame-retardant agent is employed, such as a chlorinated phosphate ester, the flame-spread properties are less than about 20; for example, 15. The process of the invention provides for reaction times typically of less than under 15 seconds to gel, and a substantially full cure time in less than 5 minutes, and typically about 1 to 2 minutes, and also provides for rapid demolding of the part from the mold. The process provides for open or closed-mold parts which are rigid, but not ecessively brittle, and which have high mold grain strength.

Typically, the amount of the blowing agent to be employed may vary, and generally may range from 0 parts, when no blowing is desired, to about 15 parts by weight per 100 parts of the MDI prepolymer. While the amount of the silicone may vary, the silicone generally ranges from about 0 to 2 parts by weight per 100 parts of the MDI prepolymer, such as, for example, from about 0.1 to 0.7 parts by weight. Where moisture-scavenging agents are employed to reduce foaming, such as in the preparation of solid spray coatings, the amount of a water-scavenging agent may vary, depending on the amount of the moisture; however, amounts ranging from about 0.5 to 15 parts; for example, from 5 to 10 parts, per 100 parts of MDI, may be employed. Further, where strengthening fibers, such as glass fibers, are introduced into the reactive spray, amounts ranging from up to about 30% by weight of glass fibers, and more typically from about 10 to 25 parts per weight, of the MDI may be employed as glass fibers.

The invention will be described for the purpose of illustration only in connection with certain embodiments; however, it is recognized that various changes, modifications, additions and improvements may be made by those persons skilled in the art, all falling within the spirit and scope of the invention.

DESCRIPTION OF THE EMBODIMENTS

EXAMPLE 1

A- and B-side component compositions were prepared as follows:

A side 75 parts of MDI prepolymer, having 21.9% free NCO. The MDI prepolymer is prepared by reacting 100 parts of a 2.4 isomer of MDI (Rubicon 209 from Rubicon Chemical Company, with a functionality of 2.4) with 65 parts by weight of an ethylene polypropylene glycol polymer. The components were mixed and heated to 180° F. for about 2 hours.

B side 35 parts of caprolactone trifunctional polyol with an average molecular weight of 300, a hydroxyl number of 560 and a viscosity of 225 at 55° C. (Tone 0301 polyol (Tone is a trademark of Union Carbide Corporation)), and 1 part of a triazene catalyst (Polycat 41 of Abbott Laboratories, a triazene trimerization catalyst). The A- and B-side components were admixed and sprayed together through a high-pressure impingement spray mixer onto an open mold, using about 20% chopped fiberglass at a mixing pressure of about 500 psi and at a temperature of about 140° F. The reaction time to gel was approximately 6 seconds, and full cure time occurred in about 1 minute. Demolding from the mold occurred in 2 minutes at a thickness of 0.25 inches. The spray-molded part produced was rigid, was not brittle and had a high mold green strength. After demolding, the sprayed part was burned under an open flame, and no smoking or flame spread occur. Additional sprayed samples were placed in an oven at 400° F. for 1 hour, and no softening or distorting of the part occurred.

EXAMPLE 2

Example 1 was repeated using 35 parts of the caprolactone polyol with 66 parts of the MDI prepolymer, and with the trimerization catalyst replaced with a typical urethane catalyst of 0.1 part of a tetravalent tin urethane catalyst (a dibutyl dilauryl tin). The gel time of the resulting polymer was about 8 seconds, and the cure time was about 4 minutes. Demolding of the part occurred in 8 minutes, with poor mold green strength. After cooling, the sprayed parts showed good tensile strength and good impact resistance, but burned and melted, while the heat-distortion temperatures of the sprayed part were below 200° F. Thus, the sprayed material was rigid, slow in curing and had excellent tensile strength, with good impact resistance; however, the material burned and softened when heated at 180° F. As in Example 1, the same materials, when used in the presence of a trimerization catalyst, provided for hdts of over 400° F., with low smoke and flame spread, at an index of 113. With indexes of 136, the sprayed parts were slightly brittle.

EXAMPLE 3

Example 1 was again repeated, employing the B-side components, but substituting for the MDI prepolymer a 2.9 functionality, crude MDI. Gelation was slower, demolding was slower and the mold green strength was poor. The resulting sprayed parts were more brittle, and the heat-distortion temperatures were over 400° F. Thus, the substitution of conventional MDI, instead of the prepolymer, with the low-functionality MDI and the flexible polyols, assured much slower curing, while the impact resistance with the use of the prepolymer was also higher.

EXAMPLE 4

Examples 1-3 were repeated with the A- and B-side components injected into a closed mold, with the same results.

EXAMPLE 5

Example 1 was repeated with the A and B components sprayed onto a gel coat made from a neopentyl glycol resin in an open mold. The adhesion of the sprayed polymers was excellent, together with excellent stiffness. Cure times were in minutes without roll out, as in conventional polyesters. The A- and B-side components were also sprayed onto a vacuum-formed acrylic part, instead of the isophalic polyester resin with chopped glass as a substrate, and adhesion and stiffness were once again excellent. The A- and B-side components were then sprayed onto an aliphatic polymer coating in an open mold, with excellent resistance to the aliphatic polymer, such as an aliphatic urethane polymer. The sprayed samples on the aliphatic urethane substrate and on the polyester gel coat were placed in the oven at 275° F. for 1 hour, and the results showed no blistering or delamination.

EXAMPLE 6

Example 1 was repeated, except employing about 10 parts of a trichloro phosphate ester as a flame-retardant agent to the B side. The addition of the phosphate ester reduced the viscosity of the B side and reduced the flame spread of the resulting sprayed part, while no other physical properties appeared to change in the sprayed part.

EXAMPLE 7

Example 1 was repeated, except employing a potassium octoate as the trimerization catalyst, and including on the B side about 10 parts of a glycerine containing 10% of dehydrated molecular-sieve particles, to act as a moisture-scavenging agent. The resulting sprayed part did not have any tendency to foam.

EXAMPLE 8

A foam-sprayed polyisocyanurate polymer is prepared by employing about 10 parts of Freon 113 to the B side as a foaming agent, together with 1 part of a silicone cell-control agent; for example, a glycol silicone copolymer. On spraying the A- and B-side components, a foam-sprayed coating on a substrate is prepared. the foam-sprayed product having excellent properties and good wet-out onto a glass-fiber, gel-coat substrate.

EXAMPLE 9

The composition of Example 1 was employed, except that 25 parts of the trifunctional Tone 0301 polyol (MW 300, hydroxyl number 50, melting point <0° C., viscosity centistokes at 55° C. 225) was used in combination with 10 parts of the difunctional Tone 0201 polyol (MW 556, hydroxyl number 216, liquid at 20° C., viscosity 300 cps). The sprayed reaction product had an improved low temperature impact resistance in comparison to the sprayed product of Example 1. The Tone 0301 and 0201 polyols were soluble with each other and reduced the viscosity of the overall system which made the composition easier to spray.

What is claimed is:

1. A process for preparing a high heat-distortion-temperature polyisocyanurate polymer, which process comprises: reacting 100 parts of an MDI prepolymer with from about 5 to 50 parts by weight of a caprolactone polyester polyol in the presence of a catalytic amount of a trimerization catalyst, and wherein the MDI prepolymer is prepared by reacting 100 parts of an MDI, having a functionality of about 2.4 or less, with from about 35 to 75 parts of an ethylene-oxide-capped, polypropylene oxide polyol.

2. The process of claim 1 wherein the MDI employed in preparing the prepolymer comprises a 2.4 isomer MDI.

3. The process of claim 1 wherein the prepolymer has an NCO percentage content ranging from about 15% to 25% by weight.

4. The process of claim 1 wherein the caprolactone polyester polyol has a hydroxyl number ranging from about 300 to 600.

5. The process of claim 1 wherein the caprolactone polyester polyol is a trifunctional polyol having a melting point of less than about 20° C.

6. The process of claim 1 which includes reacting from about 35 to 50 parts of the caprolactone polyester polyol with 100 parts of the MDI prepolymer.

7. The process of claim 1 wherein the trimerization catalyst comprises an organo metal salt, a quaternary-ammonium salt or a triazene compound.

8. The process of claim 1 wherein the catalyst is present in an amount ranging from about 0.1 to 2 parts by weight per 100 parts of the MDI prepolymer.

9. The process of claim 1 which includes carrying out the reaction in the presence of a blowing amount of a blowing agent, to provide a foam polyisocyanurate polymer.

10. The process of claim 9 wherein the blowing agent comprises from about 0.1 to 15 parts by weight per 100 parts of MDI of a halocarbon.

11. The process of claim 1 which includes carrying out the reaction in the presence of a water-scavenging amount of a water-scavenging agent, to prevent foaming of the reaction mixture, due to the presence of moisture.

12. The process of claim 9 which includes carrying out the reaction in the presence of a cell-control amount of a silicone agent.

13. The process of claim 1 which includes carrying out the reaction in the presence of a flame-retardant agent.

14. The process of claim 13 which includes carrying out the reaction in the presence of a trichloro phosphate ester flame-retardant agent present in an amount ranging from about 0.1 to 15 parts by weight per 100 parts of the MDI prepolymer.

15. The process of claim 1 which includes preparing an A-side composition containing the MDI prepolymer and a B-side composition containing the caprolactone polyester polyol and the trimerization catalyst, and spraying the A- and B-side compositions together onto a substrate.

16. The process of claim 15 which includes spraying the A- and B-side compositions and employing the spraying reaction in a glass-fiber strengthening amount of glass fibers introduced into the reaction mixture.

17. The process of claim 15 which includes spraying the A- and B-side compositions onto a substrate, which substrate comprises a polyester resin gel-coat layer and an acrylic resin or an aliphatic urethane polymer in an open mold.

18. The process of claim 15 which includes spraying substantially equal volumes of the A- and B-side compositions together onto a substrate, which substrate contains glass fibers.

19. The polyisocyanurate polymer prepared by the process of claim 1.

20. The polyisocyanurate polymer prepared by the process of claim 1, which polymer has a heat-distortion temperature of about 400° F. or more.

21. The polyisocyanurate polymer prepared by the process of claim 1, wherein the gel time is less than about 10 seconds and the cure time is less than about 5 minutes, and which polymer has a heat-distortion temperature of about 400° F. or more.

22. The process of claim 1 which includes spraying the A- and B-side compositions onto a substrate, which substrate comprises a polyester resin gel-coat layer and an acrylic resin or an aliphatic urethane polymer in an open mold.

23. A process for preparing a slow-burning, low-smoking, high heat-distortion-temperature polyisocyanurate polymer, which process comprises: preparing A- and B-side compositions and spraying together the A- and B-side compositions onto a substrate, wherein the A-side composition comprises 100 parts of an MDI prepolymer, the prepolymer prepared by reacting 100 parts of an MDI of a 2.4 isomer, having a functionality of about 2.4 or less, with from about 35 to 75 parts of an ethylene-oxide-capped polypropylene oxide polyol, having a hydroxyl number of less than about 50, and the B-side composition comprises from about 5 to 50 parts of a caprolactone polyester polyol, having a hydroxyl number ranging from about 300 to 600, and which includes a catalytic amount of a trimerization catalyst, the polyisocyanurate polymer so prepared having a heat-distortion temperature of about 400° F. or more.

24. The process of claim 23 which includes adding to the B-side composition up to about 15 parts by weight of a phosphate flame-retardant agent.

25. The polyisocyanurate polymer prepared by the process of claim 23.

26. The process of claim 23 which includes spraying the A and B compositions together onto a polymeric substrate in an open mold.

27. The polyisocyanurate-coated substrate prepared by the process of claim 23.

28. The process of claim 23 which includes introducing chopped fiberglass into the A and B sprayed compositions, to prepare a glass-fiber polyisocyanurate polymer.

29. The glass-fiber-containing polyisocyanurate polymer prepared by the process of claim 23.

30. The process of claim 1 wherein the caprolactone polyol comprises a combination of a trifunctional and a difunctional caprolactone polyols which both have an average molecular weight of less than about 600.

31. The polyisocyanurate polymer prepared by the process of claim 30.

32. The process of claim 1 wherein the polylactone polyol comprises a combination of a trifunctional and a difunctional polylactone polyols.

33. The polyisocyanurate polymer prepared by the process of claim 32.

* * * * *